United States Patent
Ichimi (10) Patent No.: US 9,372,652 B2
(45) Date of Patent: Jun. 21, 2016

(54) IMAGE PROCESSING APPARATUS, CONTROL METHOD, AND COMPUTER PROGRAM

(71) Applicant: CANON KABUSHIKI KAISHA, Tokyo (JP)

(72) Inventor: Hideshi Ichimi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 234 days.

(21) Appl. No.: 14/233,979

(22) PCT Filed: Nov. 19, 2013

(86) PCT No.: PCT/JP2013/006792
§ 371 (c)(1),
(2) Date: Jan. 21, 2014

(87) PCT Pub. No.: WO2014/083802
PCT Pub. Date: Jun. 5, 2014

(65) Prior Publication Data
US 2015/0347072 A1  Dec. 3, 2015

(30) Foreign Application Priority Data
Nov. 29, 2012  (JP) ................. 2012-260598

(51) Int. Cl.
*G03G 15/00* (2006.01)
*G03G 21/00* (2006.01)
(Continued)

(52) U.S. Cl.
CPC ............ *G06F 3/1285* (2013.01); *G03G 15/502* (2013.01); *G06F 3/121* (2013.01); *G06F 3/1229* (2013.01); *G09B 5/02* (2013.01); *H04N 1/00896* (2013.01); *H04N 5/781* (2013.01); *H04N 9/8042* (2013.01)

(58) Field of Classification Search
CPC . G03G 15/5016; G03G 15/502; G03G 21/14; G06F 3/1285; G06F 3/121; G06F 3/1229; H04N 1/00408; H04N 1/11278
USPC .............................. 399/8, 81; 358/1.14, 1.15
See application file for complete search history.

(56) References Cited

U.S. PATENT DOCUMENTS 4,475,806 A  10/1984  Daughton et al. .......... 355/14 R
8,270,803 B2  9/2012  Ichioka et al.
(Continued)

FOREIGN PATENT DOCUMENTS

| JP | 59-78372 A | 5/1984 |
| JP | 08-69223 A | 3/1996 |
| JP | 2005184728 A | 7/2005 |
| JP | 2008046366 A | 2/2008 |
| JP | 2008211581 A | 9/2008 |
| JP | 2010219735 A | 9/2010 |

OTHER PUBLICATIONS

International Search Report and Written Opinion of the International Search Authority issued in counterpart application No. PCT/JP2013/006792 dated Feb. 4, 2014.

*Primary Examiner* — Sophia S Chen
(74) *Attorney, Agent, or Firm* — Fitzpatrick, Cella, Harper & Scinto (57) ABSTRACT

Provided is an image processing apparatus that suspends a maintenance video being reproduced when a maintenance screen is switched from the foreground to the background upon detection of occurrence of an event. If the detected event is not an event occurred in response to a user operation, the image processing apparatus returns a reproduction start position of the suspended maintenance video from the suspended position backwards by a predetermined time.

10 Claims, 8 Drawing Sheets

(51) Int. Cl.
*G06F 3/12* (2006.01)
*H04N 1/00* (2006.01)
*G09B 5/02* (2006.01)
*H04N 5/781* (2006.01)
*H04N 9/804* (2006.01)

(56) References Cited

U.S. PATENT DOCUMENTS

2005/0180728 A1 8/2005 Ichioka et al.
2014/0153027 A1* 6/2014 Nakamura ......... H04N 1/00663
358/1.14

* cited by examiner

IMAGE PROCESSING APPARATUS, CONTROL METHOD, AND COMPUTER PROGRAM

TECHNICAL FIELD

The present invention relates to an image processing apparatus, a control method, and a computer program.

BACKGROUND ART

Conventionally, there has been proposed an image processing apparatus that displays information for urging a maintenance operation for recovering a failure on a screen upon occurrence of the failure for disabling printout. For example, Patent Document 1 discloses an image processing apparatus that displays an operation procedure for releasing a jam condition by means of illustration or message when processing such as paper jamming, toner replenishing, or the like is necessary. Also, Patent Document 2 discloses an image processing apparatus that displays video data about a jam processing procedure performed by a sheet-passing unit on an operation unit. In the following description, video indicating a maintenance operation for recovering a failure is described as "maintenance video" and a screen on which maintenance video is to be displayed is described as a "maintenance screen".

CITATION LIST

Patent Literature

Patent Literature 1: Patent Application Laid-Open No. 59-78372
Patent Literature 2: Patent Application Laid-Open No. 8-69223

An image processing apparatus (image processing apparatus A) that displays another screen in front of a maintenance screen by suspending a maintenance video being reproduced in response to the depressing of a key in the operation unit by a user during reproduction of the maintenance video is contemplated. Also, an image processing apparatus (image processing apparatus B) that displays another screen in front of a maintenance screen by performing a discussion board function for displaying a notice to a user, a data import function, and a data export function from a remote terminal is contemplated.

The image processing apparatus A moves a maintenance screen from the foreground to the background intentionally by a user operation. Thus, a user who performs the operation usually remembers how long the user has watched a maintenance video, and thus, the user can make an assumption that the maintenance video is to be reproduced from which position when the user displays the maintenance screen again. Thus, no problem occurs even if the image processing apparatus A resumes reproduction of the maintenance video from the suspended position.

On the other hand, since the image processing apparatus B moves the maintenance screen from the foreground to the background in response to the occurrence of an event such as a notice reception or the like from a remote terminal, an unintentional screen is suddenly displayed for a user who has been watching the maintenance screen. Thus, it is contemplated that a user may forget how long the user has watched the maintenance video or what operation procedure the user should do next. Consequently, when the image processing apparatus B reproduces the maintenance video from the suspended position, the user cannot meet a time deadline for the next operation procedure or needs to perform processing for manually returning the reproduction position, resulting in waste of time and labor.

SUMMARY OF INVENTION

The present invention provides an image processing apparatus that prevents a video scene required for the maintenance operation from being missed by a user when reproduction of video indicating the maintenance operation is resumed after the video has been suspended by the occurrence of an event unintended by the user.

According to an aspect of the present invention, an image processing apparatus is provided that includes a reproducing unit configured to reproduce a maintenance video indicating a maintenance operation and to display the reproduced maintenance video on a maintenance screen; a suspending unit configured to suspend the maintenance video being reproduced in response to detection of occurrence of an event; a first determining unit configured to determine whether or not the detected event is an event occurred in response to a user operation; and a position adjusting unit configured to return a reproduction start position of the suspended maintenance video from the suspended position backwards by a predetermined time if the first determining unit determines that the detected event is not an event occurred in response to a user operation.

According to the present invention, an image processing apparatus that can reproduce a maintenance video by returning the reproduction start position of the suspended maintenance video from the suspended position backwards by a predetermined time when the maintenance video being reproduced is suspended by the occurrence of an event unintended by a user and then the user is returned to a maintenance screen. With this arrangement, the image processing apparatus can prevent a video scene required for the maintenance operation from being missed by a user and the time and labor required for a user to manually return the reproduction position of video can be saved.

Further features of the present invention will become apparent from the following description of exemplary embodiments with reference to the attached drawings.

DESCRIPTION OF EMBODIMENTS

Hereinafter, preferred embodiments of the present invention will be described with reference to the drawings. It should be noted that the following embodiments are not intended to limit the present invention according to the claims and all the combination of subject features disclosed in the respective embodiments is not essential for the solution of the present invention.

(First Embodiment)

Figure 1:
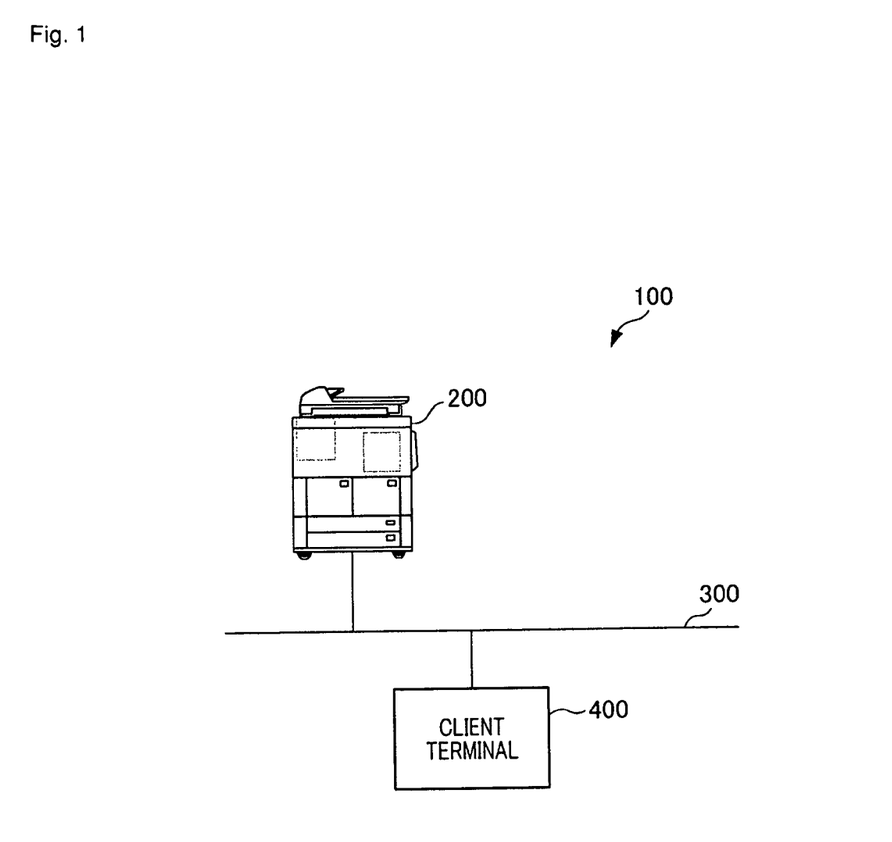
FIG. 1 is a diagram illustrating a system configuration according to a first embodiment.

FIG. 1 is a diagram illustrating a system configuration according to a first embodiment. A system 100 is an information processing system according to the first embodiment. The system 100 includes an image processing apparatus 200 and a client terminal 400. The image processing apparatus 200 communicates with the client terminal 400 via LAN (Local Area Network) 300. The image processing apparatus 200 is an image processing apparatus that executes image processing (generation, output, and the like of image data). The image processing apparatus 200 is, for example, a printer or a facsimile.

The client terminal 400 is an information processing apparatus that communicates with the image processing apparatus 200 in accordance with a user operation and transmits various types of information required for image processing to the image processing apparatus 200. The client terminal 400 includes a CPU, a ROM, a RAM, an HDD, and a network I/F (Interface) (none of which is shown), where CPU is an abbreviation for Central Processing Unit, ROM is an abbreviation for Read Only Memory, RAM is an abbreviation for Random Access Memory, and HDD is an abbreviation for Hard Disk Drive.

The network I/F is connected to the LAN 300. The client terminal 400 transmits and receives various types of information to and from other devices via the LAN 300. The CPU executes a control program stored in the ROM to thereby control the operation of the entire client terminal 400. The RAM is used as a temporal storage region such as a main memory, a work area, or the like for the CPU. The HDD stores various types of programs, video contents, various types of information received from other devices, and the like.

Figure 2:
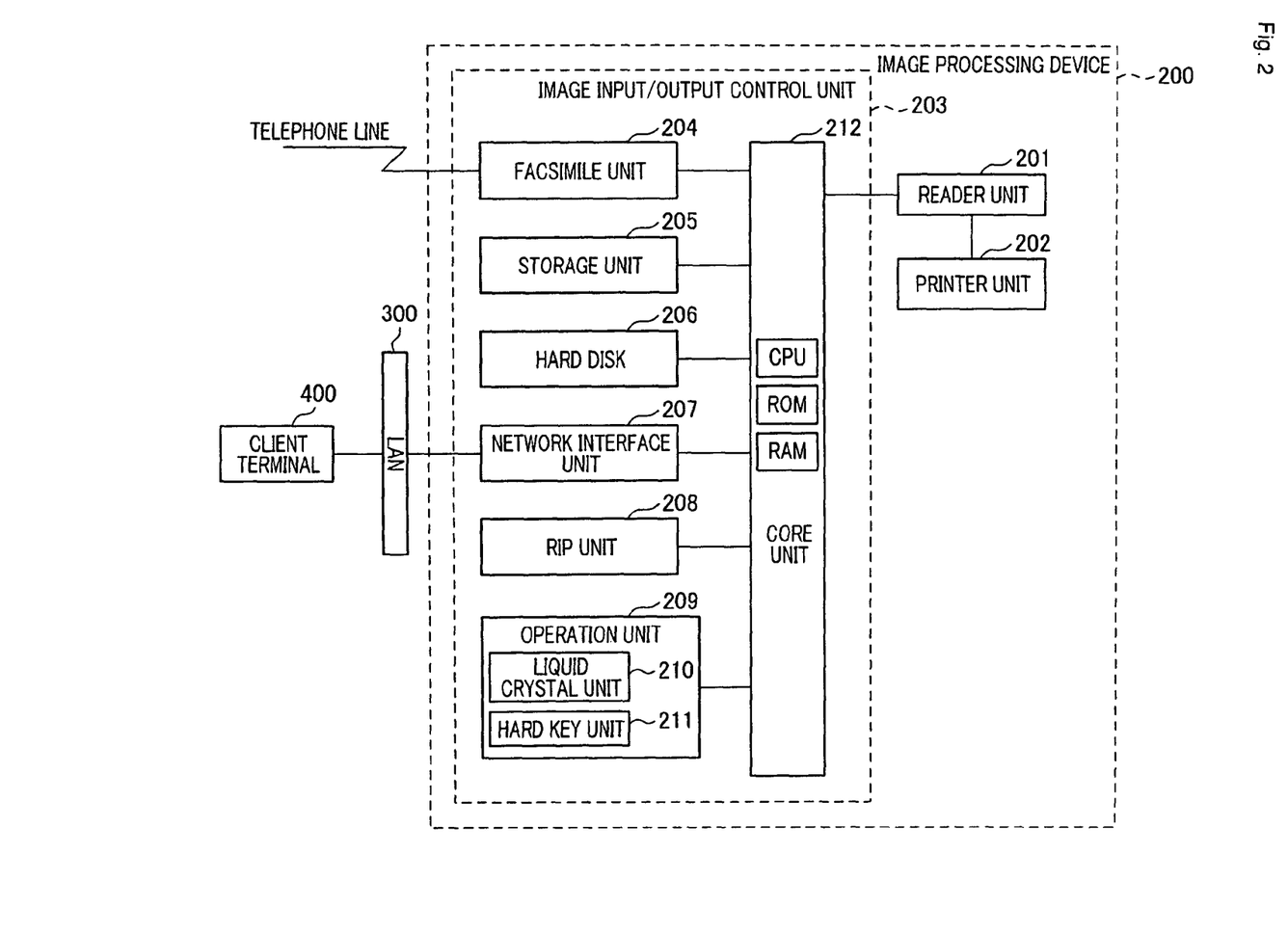
FIG. 2 is a diagram illustrating an exemplary configuration of an image processing apparatus.

FIG. 2 is a diagram illustrating an exemplary configuration of an image processing apparatus. The image processing apparatus 200 shown in FIG. 2 provides functions such as a copy function, print function, send function, box function, pull-print function, and the like. The image processing apparatus 200 includes a reader unit 201, a printer unit 202, an image input/output control unit 203. The reader unit 201 reads out an image of an original and then outputs image data corresponding to the original image to the image input/output control unit 203. The printer unit 202 receives image data from the image input/output control unit 203 and then records an image corresponding to the received image data on a recording sheet.

The image input/output control unit 203 controls image data input/output processing. The image input/output control unit 203 is connected to the reader unit 201 and the printer unit 202. The image input/output control unit 203 includes a facsimile unit 204, a storage unit 205, a hard disk 206, a network interface unit 207, an RIP unit 208, an operation unit 209, and a core unit 212.

The facsimile unit 204 receives compressed image data via a telephone line. The facsimile unit 204 expands the received compressed image data and then transfers the expanded image data to the core unit 212. Also, the facsimile unit 204 compresses image data transferred from the core unit 212 and then transmits the compressed image data via the telephone line. Image data received/transmitted from/to the facsimile unit 204 can be temporarily stored in the hard disk 206 connected to the storage unit 205.

The storage unit 205 compresses image data transferred from the core unit 212 and then stores the compressed image data in the hard disk 206 together with the ID number for searching the image data. Also, the storage unit 205 searches compressed image data stored in the hard disk 206 based on code data transferred via the core unit 212, reads out and expands the searched compressed image data, and then transfers the expanded image data to the core unit 212.

The network interface unit 207 is an interface between the LAN 300 and the core unit 212. The RIP unit 208 develops code data (PDL) transferred from the LAN 300 into image data which can be recorded by the printer unit 202.

The operation unit 209 includes a liquid crystal unit 210 and a hard key unit 211 and performs an operation instruction, an operation setting, or the like to the image processing apparatus 200 by a user interface. The core unit 212 controls the flow of data among the reader unit 201, the printer unit 202, the facsimile unit 204, the storage unit 205, the hard disk 206, the network interface unit 207, the RIP unit 208, and the operation unit 209. The core unit 212 includes a CPU, a ROM, a RAM, and the like. The CPU executes a computer program stored in the ROM on the RAM to thereby integrally control the entire apparatus. With this arrangement, a method for controlling the image processing apparatus of the present embodiment is realized.

Figure 3:
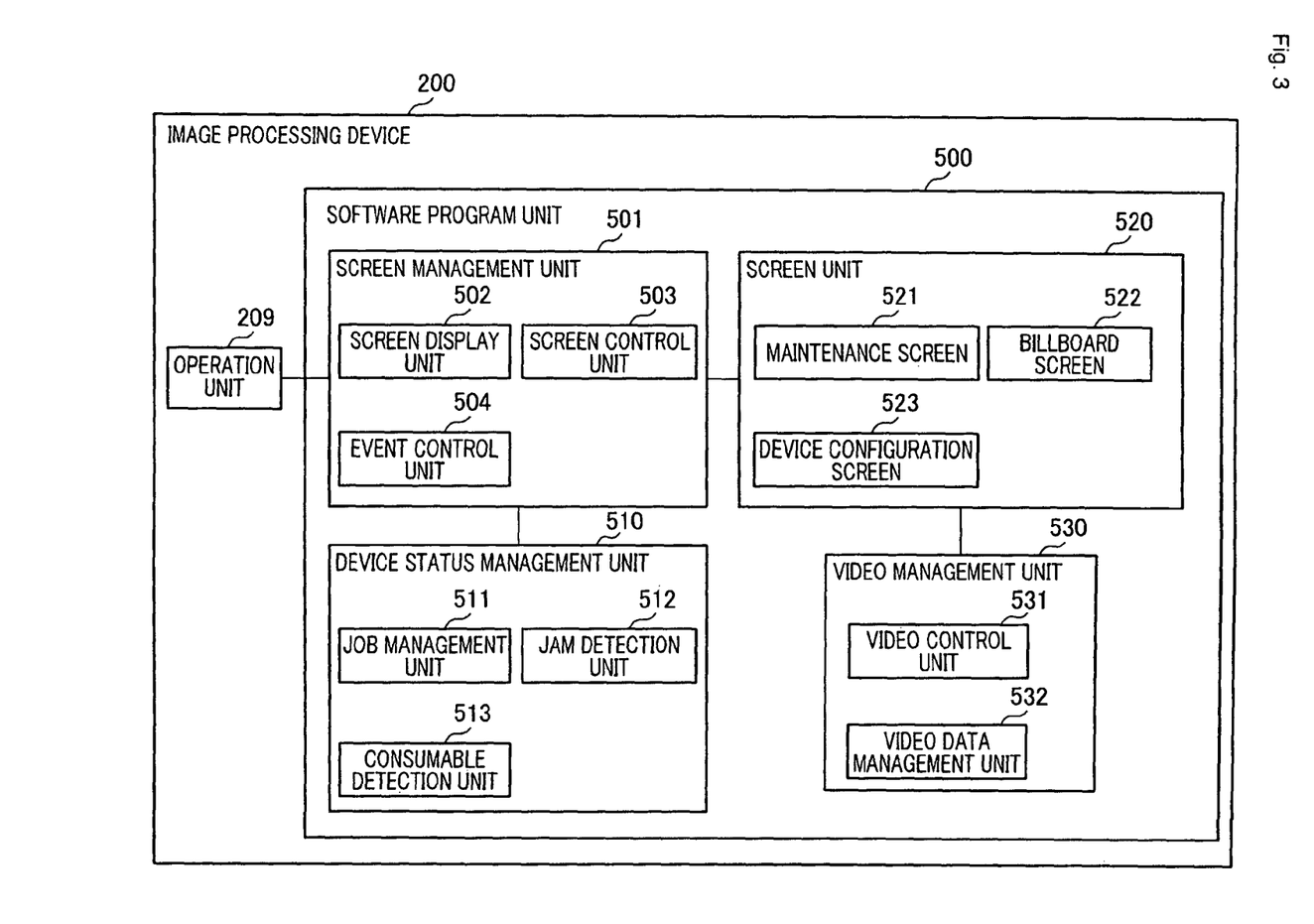
FIG. 3 is a functional block diagram illustrating an image processing apparatus.

FIG. 3 is a functional block diagram illustrating an image processing apparatus. The image processing apparatus 200 includes an operation unit 209 and a software program unit 500. The functions of the operation unit 209 and the software program unit 500 are realized by executing the control programs by the core unit 212 including a CPU, a RAM, and a ROM.

The operation unit 209 inputs and displays information in response to a user operation. The software program unit 500 controls screen display processing and video reproduction processing to be displayed on the liquid crystal unit 210 (FIG. 4) provided in the operation unit 209.

The software program unit 500 includes a screen management unit 501, a screen unit 520, a device status management unit 510, and a video management unit 530. The screen management unit 501 controls screen display processing to be displayed on the operation unit 209. The screen management unit 501 includes a screen display unit 502, a screen control unit 503, and an event control unit 504.

The screen display unit 502 generates a screen to be displayed on the liquid crystal unit 210 of the operation unit 209, and displays the screen on the liquid crystal unit 210. Also, the screen display unit 502 displays a maintenance video reproduced by a video control unit 531 on the liquid crystal unit 210 of the operation unit 209. In other words, the screen display unit 502 and the video control unit 531 reproduce a video indicating a maintenance operation and display the video on a maintenance screen.

The screen control unit 503 receives event information transmitted from the event control unit 504, and determines which screen is switched to the foreground based on the received event information to thereby perform screen switch control such that an optimum screen from among the screens provided in the screen unit 520 is in the foreground. In other words, the screen control unit 503 switches a screen corresponding to an event indicated by the received event information to the foreground. Also, the screen control unit 503 has not only a screen switch function but also a function that notifies the foreground screen of information about a key depressed by the operation unit 209 or the like.

The event control unit 504 receives operation information (screen operation information) obtained by the screen operation of the liquid crystal unit 210 and the hard key unit 211 provided in the operation unit 209, and then notifies the screen control unit 503 of screen operation information. Also, the event control unit 504 receives not only screen operation information but also a device status event from the device status management unit 510. The device status event is a screen-related event occurred in the image processing apparatus 200. The event control unit 504 notifies the screen control unit 503 of a device status event as event information. Furthermore, the event control unit 504 receives an event in accordance with an instruction given by the remote terminal 400 or the like, and notifies the screen control unit 503 of event information. As described above, the event control unit 504 integrally manages a screen-related event occurred in the image processing apparatus 200, and notifies the screen control unit 503 of the screen-related event.

The device status management unit 510 manages the status of the image processing apparatus 200. The device status management unit 510 includes a job management unit 511, a jam detection unit 512, and a consumable detection unit 513. The job management unit 511 stores job information for setting a job such as a start time of a job in processing, a job type, a document name, a number of sheets, a number of copies, presence/absence of stapling, or the like in the RAM of the core unit 212 or the hard disk 206. The job management unit 511 notifies the event control unit 504 of job information as required.

The job type is the type of a job performed by the image processing apparatus 200, such as copy, print, send, save, or the like. The jam detection unit 512 specifies a location at which paper jam has occurred in the interior of the image processing apparatus 200 and then makes a jam-occurred flag to the location to thereby notify the event control unit 504 of the jam-occurred flag as required.

The consumable detection unit 513 detects the remaining amount of consumables provided in the interior of the image processing apparatus 200. Examples of consumables include toners, staple needles, paper sheets, and the like. The consumable detection unit 513 also detects the amount of a waste material accumulated in the interior of the image processing apparatus 200, such as punched dust, waste toner, or the like, and notifies the event control unit 504 of the amount of the waste material as required.

The screen unit 520 has screens such as a maintenance screen 521, a discussion board screen 522, a device configuration screen 523, and the like. While FIG. 3 only illustrates screens required for explaining the present embodiment, the present invention is of course applicable to other screens.

The maintenance screen 521 is a screen for displaying information indicating the maintenance procedure for recovering a failure occurred in the image processing apparatus 200. Examples of a failure include a paper jam and the fact that the remaining amount of consumables is equal to or less than a predetermined amount. When the jam detection unit 512 detects a paper jam or when the consumable detection unit 513 detects that the remaining amount of consumables is equal to or less than a predetermined amount, the detected information is transmitted as event information to the event control unit 504. The event control unit 504 passes the received event information to the screen control unit 503. The screen control unit 503 switches the maintenance screen from among the screens to be displayed on the liquid crystal unit 210 to the foreground based on the received event information.

The discussion board screen 522 is a screen for displaying a message input by the client terminal 400. The message is interpreted by the core unit 212 through the LAN 300 and the network interface unit 207 in accordance with an instruction given by the client terminal 400, and then is transmitted to the software program 500. Then, the event control unit 504 receives the transmitted message and then notifies the screen control unit 503 of the transmitted message. With this arrangement, the screen control unit 503 switches the discussion board screen 522 to the foreground and the notified message is displayed on the discussion board screen 522. The device configuration screen 523 is a screen for indicating what type of hardware or software incorporated as an option into the image processing apparatus 200.

The video management unit 530 manages a video to be reproduced on a screen displayed by the screen display unit 502. The video management unit 530 includes a video control unit 531 and a video data management unit 532. The video control unit 531 controls reproduction, suspension, termination, or the like of video data. The video data management unit 532 manages video data by storing it in the RAM of the core unit 212 or the hard disk 206.

Figure 4:
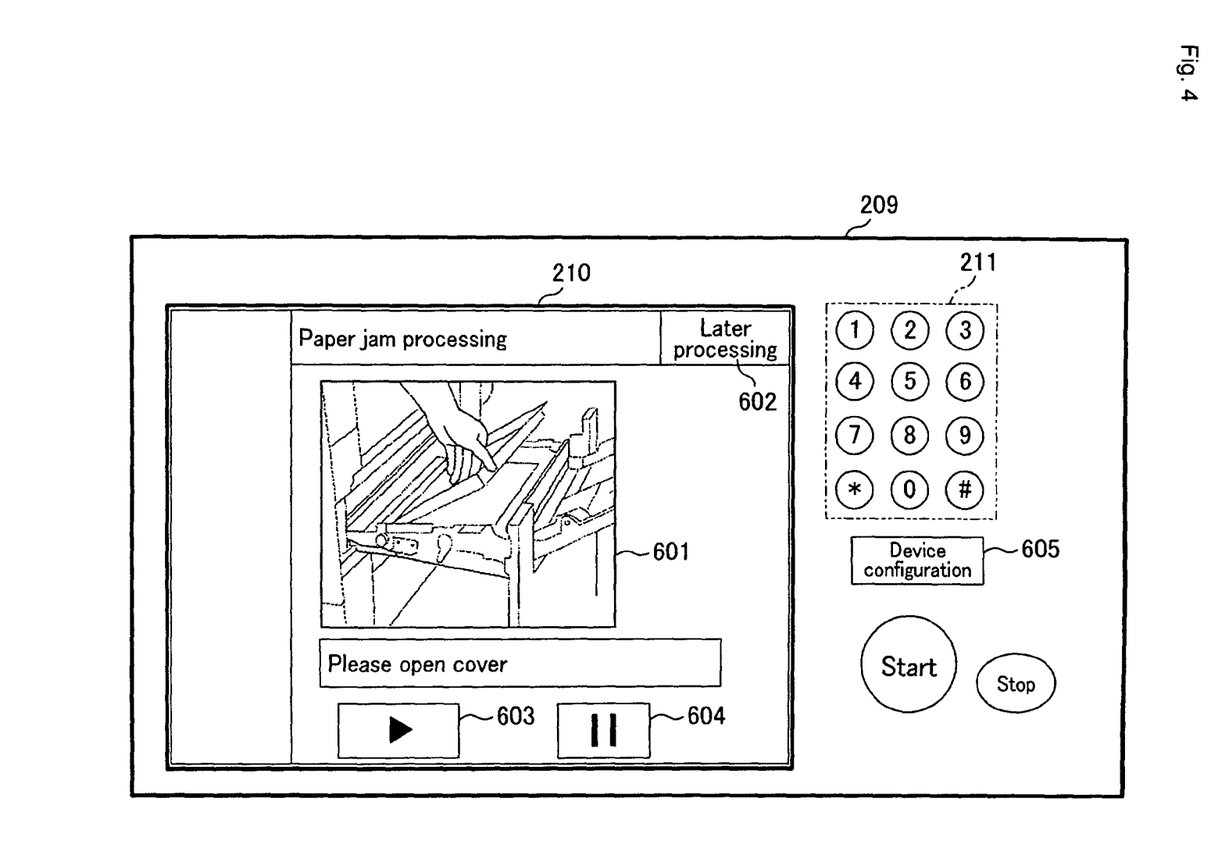
FIG. 4 is a diagram illustrating an exemplary configuration of an operation unit.

FIG. 4 is a diagram illustrating an exemplary configuration of an operation unit. The operation unit 209 includes a liquid crystal unit 210 and a hard key unit 211. The screens such as the maintenance screen 521, the discussion board screen 522, the device configuration screen 523, and the like shown in FIG. 3 are displayed on the liquid crystal unit 210. In the example shown in FIG. 4, the maintenance screen is displayed on the liquid crystal unit 210. The maintenance screen has a video display area 601, a later processing button 602, a reproduction button 603, and a suspension button 604.

The video display area 601 is an area for displaying a maintenance video suitable for a maintenance event upon occurrence of the event. The later processing button 602 is a button for alloying other functions not relating to a paper jam, such as a transmission function, to be usable by postponing removal of a paper jam (removal of paper jamming processing) in accordance with the depressing of the button by a user. The reproduction button 603 is a button for reproducing a maintenance video again when a user firstly depresses the button upon display the maintenance screen or after the video being reproduced is suspended by the suspension button 604. The button 605 in the hard key unit 211 is a button for displaying the device configuration screen 523 to the foreground in the liquid crystal unit 210 upon depressing thereof.

Figure 5:
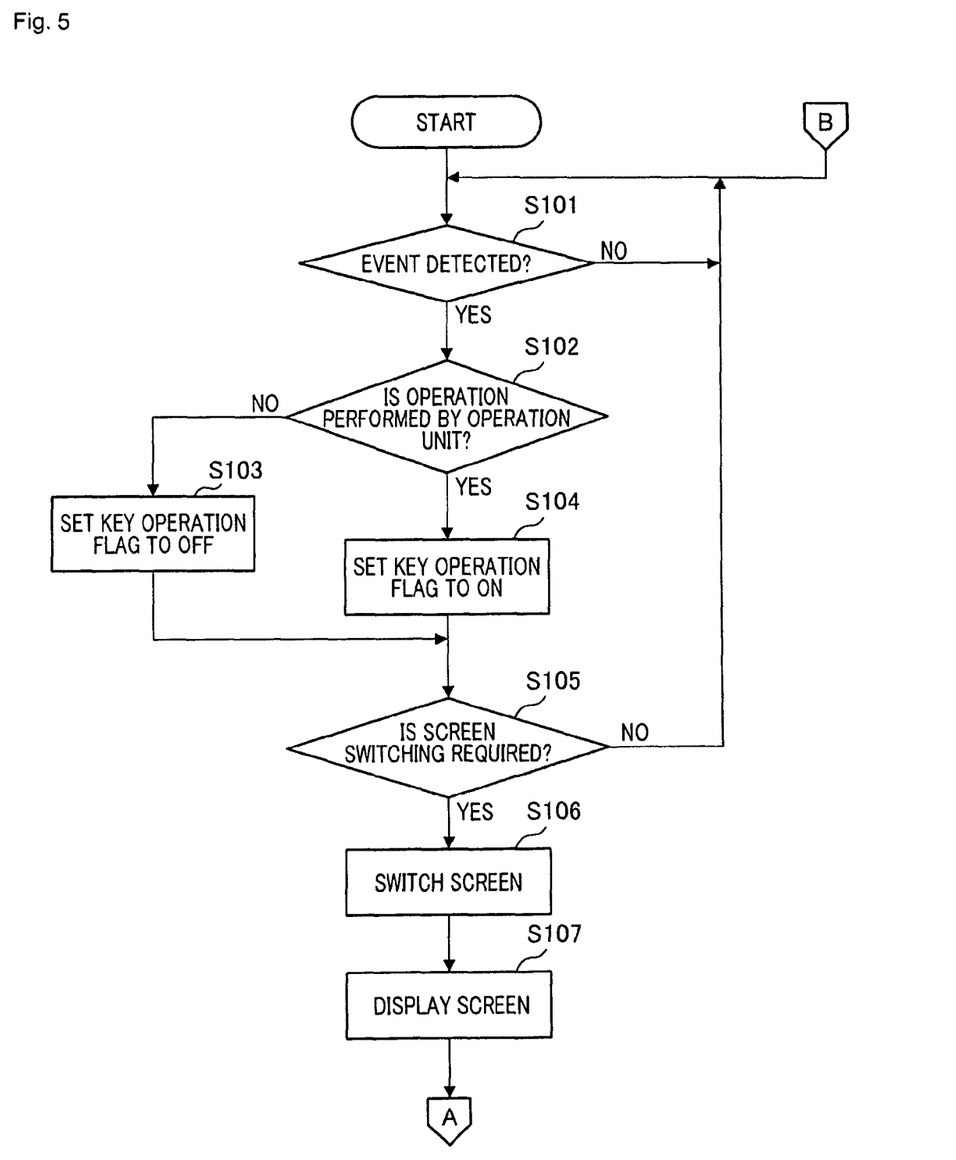
FIG. 5 is a flowchart illustrating an example of operation processing performed by an image processing apparatus.
Figure 6:
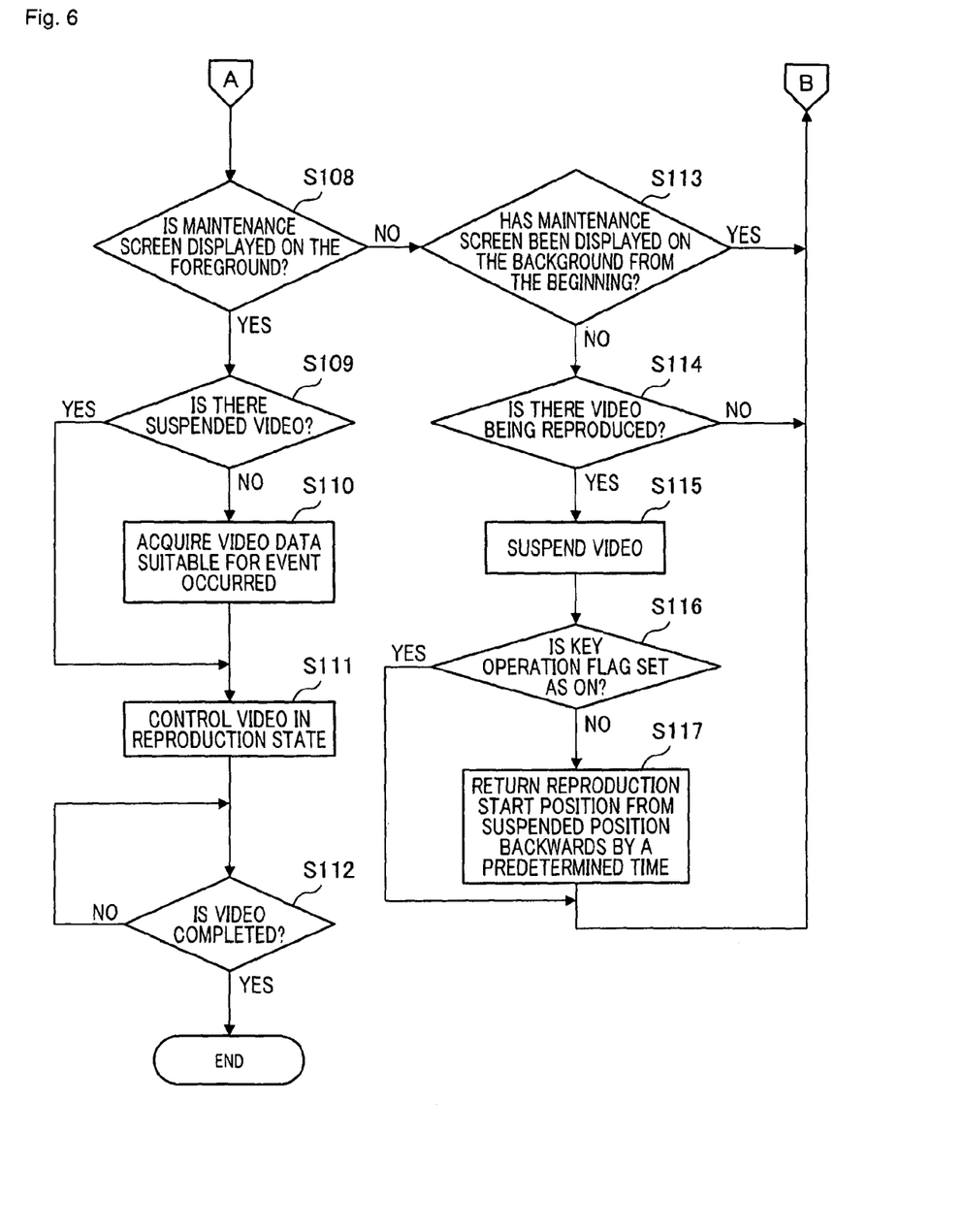
FIG. 6 is a flowchart illustrating an example of operation processing performed by an image processing apparatus.

FIG. 5 and FIG. 6 are flowcharts illustrating an example of operation processing performed by the image processing apparatus of the first embodiment. The processing to be described below is realized by reading out the control program stored in the ROM or the hard disk 206 to RAM and executing the control program by the CPU of the core unit 212 provided in the image processing apparatus 200.

Firstly, as shown in FIG. 5, the CPU of the core unit 212 determines whether or not the event control unit 504 has received an event from the operation unit 209, the device status management unit 510, or the remote terminal 400 (step S101). In other words, the event control unit 504 detects occurrence of an event. When no event has been received, the process returns to step S101. When an event has been received, the process advances to step S102.

Next, the CPU of the core unit 212 determines whether or not the event determined to have been received in step S101 is an event from the liquid crystal unit 210 or the hard key unit 211 of the operation unit 209, that is, an event generated by a user operation (step S102). When the event determined to have been received in step S101 is not an event generated by a user operation, the process advances to step S103. Then, the CPU of the core unit 212 sets a key operation flag to OFF, and then stores the key operation flag in the RAM of the core unit 212. When the event determined to have been received in step S101 is an event generated by a user operation, the process advances to step S104. Then, the CPU of the core unit 212 sets a key operation flag to ON, and then stores the key operation flag in the RAM of the core unit 212. In other words, the key operation flag indicates whether or not a user operation has been performed by using the operation unit 209.

Next, the CPU of the core unit 212 determines whether or not screen switching is required based on the event determined to have been received in step S101 (step S105). When no screen switching is required, the process returns to step S101. When screen switching is required, the process advances to step S106.

Next, the CPU of the core unit 212 causes the screen control unit 503 to switch a screen corresponding to the content of the received event to the foreground (step S106). Next, the CPU of the core unit 212 causes the screen display unit 502 to display the screen on the liquid crystal unit 210 (step S107), and the process advances to step S108 in FIG. 6.

Next, as shown in FIG. 6, the CPU of the core unit 212 determines whether or not the maintenance screen 521 is displayed on the foreground (step S108). When the maintenance screen 521 is displayed on the foreground, the process advances to step S109. When another screen different from the maintenance screen 521 is displayed on the foreground, the process advances to step S113.

In step S113, the CPU of the core unit 212 determines whether or not the maintenance screen 521 has been displayed on the background from the beginning when another screen different from the maintenance screen 521 is displayed on the foreground (step S113). The determination processing in step S113 is executed by the screen control unit 503 from among the processing units shown in FIG. 3. In other words, the screen control unit 503 is a second determining unit that determines whether or not the maintenance screen has been switched from the foreground to the background in response to detection of occurrence of an event. When the maintenance screen 521 has been displayed on the background from the beginning, the process returns to step S101 in FIG. 5. When the maintenance screen 521 has not been displayed on the background from the beginning but has been switched from the foreground to the background, the process advances to step S114.

Next, the CPU of the core unit 212 determines whether or not there is a video being reproduced on the maintenance screen 521 (step S114). When it is determined that there is a video being reproduced on the maintenance screen 521, the process advances to step S115. When it is determined that there is no video being reproduced on the maintenance screen 521, the process returns to step S101 in FIG. 5.

In step S115, the CPU of the core unit 212 suspends a video being reproduced on the maintenance screen 521, and the process advances to step S116. The processing in step S115 is executed by the screen control unit 503 and the video control unit 531 from among the processing units shown in FIG. 3. In other words, when it is determined that the maintenance screen has been switched from the foreground to the background, the screen control unit 503 and the video control unit 531 suspend the video being reproduced.

Next, the CPU of the core unit 212 determines whether or not a key operation flag is set as ON (step S116). The processing in step S116 is executed by the video control unit 531 from among the processing units shown in FIG. 3. In other words, the video control unit 531 is a first determining unit that determines whether or not the detected event is an event occurred in response to a user operation. When the key operation flag is set as ON, the CPU determines that the detected event is an event occurred in response to a user operation. Then, the process returns to step S101 in FIG. 5. When the key operation flag is set as OFF, the CPU determines that the detected event is not an event occurred in response to a user operation. Then, the process advances to step S117.

Next, the CPU of the core unit 212 returns the video suspended in step S115 backwards by a predetermined time (step S117). The processing in step S117 is executed by the video control unit 531 from among the processing units shown in FIG. 3. In other words, the video control unit 531 has a position adjustment function that returns the reproduction start position of the suspended video from the suspended position backwards by a predetermined time when it is determined that the detected event is not an event occurred in response to a user operation. After processing in step S117, the process returns to step S101 in FIG. 5.

In step S109, the video control unit 531 determines whether or not there is suspended video data on the maintenance screen in accordance with an instruction given by the CPU of the core unit 212. In this case, the video control unit 531 serves as a fifth determining unit. When there is suspended video data, the process advances to step S111. When there is no suspended video data, the process advances to step S110.

In step S110, the CPU of the core unit 212 queries the video data management unit 532 from the maintenance screen 521 to thereby acquire the event determined to have been received in step S101, i.e., optimum video data in response to the maintenance event. Then, the process advances to step S111.

Next, the CPU of the core unit 212 causes the video control unit 531 to control the new video data acquired in step S110 or the suspended video data in a reproduction state (step S111). Next, the CPU of the core unit 212 determines whether or not the video data reproduced by the video control unit 531 is completed (step S112). When the video data reproduced by the video control unit 531 is completed, the process ends. When the video data reproduced by the video control unit 531 is not completed, the process returns to step S112, and reproduction processing continues.

As described above, the image processing apparatus of the present embodiment controls whether the suspended video is returned backwards by a predetermined time or is kept stopped in-situ depending on the type of the event determined to have been received in step S101. Note that, when another screen is displayed in front of the maintenance screen, the image processing apparatus may also determine whether or not the suspended video data is returned backwards by a predetermined time depending on the type of the another screen by specifying the type thereof.

Note that, when the maintenance screen is switched from the foreground to the background and the maintenance screen is switched to the foreground again after a maintenance video being reproduced is suspended, the image processing apparatus 200 may also perform the following processing. In other words, the image processing apparatus 200 displays the maintenance screen with a video being suspended without automatically reproducing the suspended video data and reproduces the video in accordance with a user's instruction.

The image processing apparatus of the present embodiment suspends a maintenance video when another screen unintended by a user is suddenly displayed for the user during reproduction of the maintenance video and further returns a reproduction start position of the suspended maintenance video from the suspended position backwards by a predetermined time. With this arrangement, even when a user goes back to the maintenance screen again to reproduce the video, the user can remember a scene that the user missed or forgot viewing, resulting in a smooth maintenance operation.

(Second Embodiment)

Next, a description will be given of a second embodiment. The configuration of the image processing apparatus of the second embodiment is the same as that of the image processing apparatus of the first embodiment. In the second embodiment, a description will be given on the difference from the first embodiment, and thus, the same explanation as in the first embodiment will be omitted.

Figure 7:
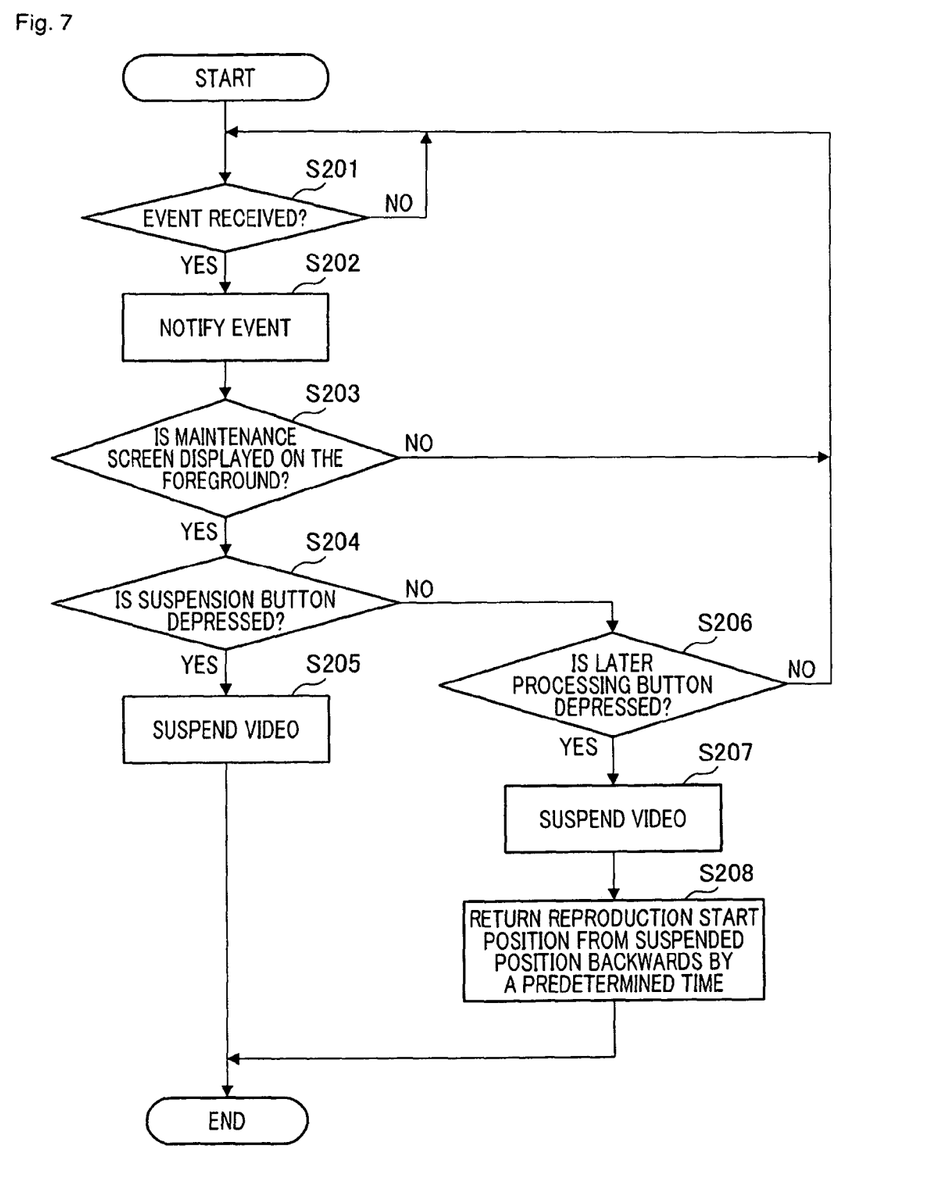
FIG. 7 is a flowchart illustrating a part of operation processing performed by an image processing apparatus.

FIG. 7 is a flowchart illustrating a part of operation processing performed by the image processing apparatus according to the second embodiment. The processing to be described below is realized by reading out the control program stored in the ROM or the hard disk 206 to RAM and executing the control program by the CPU of the core unit 212 provided in the image processing apparatus 200. The flowchart shown in FIG. 7 illustrates operation processing performed when the maintenance screen 521 is displayed on the foreground.

Firstly, the CPU of the core unit 212 causes the event control unit 504 to determine whether or not an event has been received (step S201). When no event has been received, the process returns to step S201 again. When an event has been received, the CPU of the core unit 212 causes the screen control unit 503 to notify the screens of the screen unit 520 of the received event, (step S202), and the process advances to step S203.

Next, the CPU of the core unit 212 determines whether or not the maintenance screen 521 is displayed on the foreground (step S203). When the maintenance screen 521 is not displayed on the foreground, the process returns to step S201. When the maintenance screen 521 is displayed on the foreground, the process advances to step S204.

In step S204, the CPU of the core unit 212 determines whether or not the suspension button 604 for suspending a video has been depressed through the liquid crystal unit 210 of the operation unit 209 (step S204). When the suspension button 604 has been depressed, the process advances to step S205. Then, the core unit 212 causes the video control unit 531 to suspend video data being reproduced (step S205).

When the suspension button 604 has not been depressed, the process advances to step S206. Then, the CPU of the core unit 212 determines whether or not the later processing button 602 has been depressed through the liquid crystal unit 210 of the operation unit 209 (step S206). The processing in step S206 is executed by the video control unit 531 from among the processing units shown in FIG. 3. In other words, the video control unit 531 is a third determining unit that determines whether or not a predetermined button has been depressed by a user operation when a maintenance video is being reproduced on the maintenance screen displayed on the foreground. When the later processing button 602 has not been depressed, the process returns to step S201. When the later processing button 602 has been depressed, the process advances to step S207.

Next, the CPU of the core unit 212 causes the video control unit 531 to suspend video data being reproduced (step S207), and the process advances to step S208. Then, the CPU of the core unit 212 causes the video control unit 531 to return the reproduction start position of video data suspended in step S207 backwards by a predetermined time (step S208), and the process ends.

As described above, the image processing apparatus of the present embodiment suspends a video when the suspension button 604 is simply depressed. Also, the image processing apparatus 200 returns the suspended video data backwards by a predetermined time when the later processing button is depressed, that is, when a specific button is depressed by a user operation. With this arrangement, even when a user who depresses the later processing button 602 during reproduction of a maintenance video so as to continue the procedure for maintenance later goes back to the maintenance screen again to reproduce the video, the user can remember a scene that the user missed or forgot viewing.

(Third Embodiment)

Next, a description will be given of a third embodiment. The configuration of the image processing apparatus of the third embodiment is the same as that of the image processing apparatus of the first embodiment. In the third embodiment, a description will be given on the difference from the first and second embodiments, and thus, the same explanation as in the first and second embodiments will be omitted.

Figure 8:
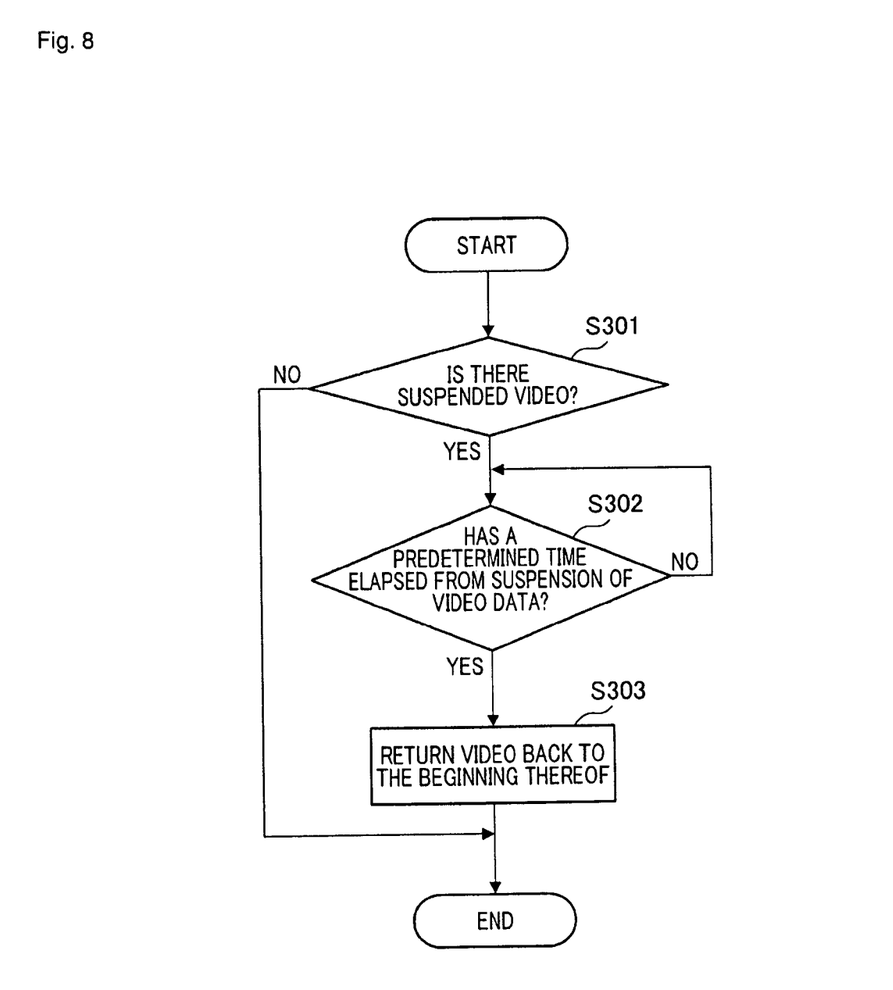
FIG. 8 is a flowchart illustrating a part of operation processing performed by an image processing apparatus.

FIG. 8 is a flowchart illustrating a part of operation processing performed by the image processing apparatus according to the third embodiment. The processing to be described below is realized by reading out the control program stored in the ROM or the hard disk 206 to RAM and executing the control program by the CPU of the core unit 212 provided in the image processing apparatus 200. The operation processing shown in FIG. 8 is processing performed after the video data being reproduced is suspended in step S115 shown in FIG. 6.

Firstly, the CPU of the core unit 212 determines whether or not there is suspended video data on the maintenance screen 521 (step S301). When there is no suspended video data, the process ends. When there is suspended video data, the process advances to step S302. In step S302, the CPU of the core unit 212 determines whether or not a predetermined time has elapsed from suspension of video data on the maintenance screen 521 (in step S115 shown in FIG. 6). In the example shown in FIG. 3, the processing in step S302 is executed by the video control unit 531. In other words, the video control unit 531 is a fourth determining unit that determines whether or not a predetermined time has been elapsed from suspension of a video when it is determined that the maintenance screen has been switched to the background and the video is suspended (in steps S113 and S114 shown in FIG. 6).

When a predetermined time has not been elapsed from suspension of video data, the CPU of the core unit 212 monitors whether or not a predetermined time has been elapsed in step S302 again. On the other hand, when a predetermined time has been elapsed from suspension of video data, the process advances to step S303. Then, the CPU of the core unit 212 instructs the video control unit 531 to return the suspended position (reproduction start position) of video data back to the beginning thereof (step S303), and the process ends.

As described above, when a predetermined time (e.g., one hour) has elapsed from suspension of video data, the image processing apparatus 200 of the present embodiment returns the suspended position of video data back to the beginning thereof. With this arrangement, a user who is viewing a maintenance video can see the maintenance video from the beginning again.

(Other Embodiments)

Also, the present invention is realized by executing the following processing. Specifically, the present invention is also realized by a computer of a system or apparatus (or devices such as a CPU or MPU) that reads out and executes software (program) for realizing the functions of the above embodiments, where the software (program) is supplied to the system or apparatus via a network or various storage media. In this case, the program itself and the storage medium storing the program constitute the present invention.

While the embodiments of the present invention have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-260598 filed on Nov. 29, 2012 which is hereby incorporated by reference herein its entirety.

The invention claimed is:

1. An image processing apparatus comprising:
a play unit configured to play a maintenance video indicating a maintenance operation on a maintenance screen;
a suspending unit configured to suspend the maintenance video being played according to detection of occurrence of an event;
a determining unit configured to determine whether or not the detected event is an event occurred according to a user operation; and
a position adjusting unit configured to, based on the determining unit determining that the detected event is not an event occurred according to the user operation, return a play start position of the suspended maintenance video from the suspended position backwards by a predetermined time.

2. The image processing apparatus according to claim 1, wherein the determining unit further determines whether or not the maintenance screen has been switched from a foreground to a background, and
wherein the suspending unit suspends the maintenance video being played based on the determining unit determining that the maintenance screen has been switched from the foreground to the background.

3. The image processing apparatus according to claim 2, wherein the determining unit further determines whether or not a predetermined button has been depressed by a user operation when the maintenance video is being played on the maintenance screen in the foreground, and
wherein, when the determining unit determines that the predetermined button has been depressed by the user operation, the suspending unit suspends the maintenance video being played and the position adjusting unit returns a play start position of the suspended maintenance video from the suspended position backwards by a predetermined time.

4. The image processing apparatus according to claim 1, wherein the determining unit further determines whether or not a predetermined button has been depressed by a user operation when the maintenance video is being played on the maintenance screen in a foreground, and
wherein, when the determining unit determines that the predetermined button has been depressed by the user operation, the suspending unit suspends the maintenance video being played and the position adjusting unit returns a play start position of the suspended maintenance video from the suspended position backwards by a predetermined time.

5. The image processing apparatus according to claim 1, wherein the determining unit further determines whether or not a predetermined time has been elapsed from suspension of the maintenance video by the suspending unit, and
wherein the position adjusting unit returns a play start position of the maintenance video back to the beginning thereof based on the determining unit determining that the predetermined time has elapsed from suspension of the maintenance video.

6. The image processing apparatus according to claim 1, wherein, when the maintenance screen is switched to a foreground again after the maintenance screen is switched from the foreground to a background and the maintenance video being played is suspended by the suspending unit, the maintenance screen with the maintenance video being suspended is played, and then the play unit plays the maintenance video in response to the user operation.

7. The image processing apparatus according to claim 1, further comprising:
a detecting unit configured to detect occurrence of the event; and
a switching unit configured to switch a screen corresponding to the event of which the occurrence has been detected to a foreground.

8. The image processing apparatus according to claim 7, wherein the determining unit further determines whether or not there is a suspended maintenance video on the maintenance screen when the switching unit switches the maintenance screen to the foreground, and
wherein the play unit plays the suspended maintenance video based on the determining unit determining that there is the suspended maintenance video on the maintenance screen.

9. A control method comprising:
playing a maintenance video indicating a maintenance operation on a maintenance screen;
suspending the maintenance video being played according to detection of occurrence of an event;
determining whether or not the detected event is an event occurred according to a user operation; and
returning, based on the determining unit determining that the detected event is not an event occurred according to the user operation, a play start position of the suspended maintenance video from the suspended position backwards by a predetermined time.

10. A non-transitory storage medium storing a readable program for causing a computer to execute the control method executed in an image processing apparatus, the method comprising:
playing a maintenance video indicating a maintenance operation on a maintenance screen;
suspending the maintenance video being played according to detection of occurrence of an event;
determining whether or not the detected event is an event occurred according to a user operation; and
returning, based on the determining unit determining that the detected event is not an event occurred according to the user operation, a play start position of the suspended maintenance video from the suspended position backwards by a predetermined time.

* * * * *